United States Patent [19]

Stretanski et al.

[11] Patent Number: 4,670,491

[45] Date of Patent: Jun. 2, 1987

[54] STABILIZED TITANIUM DIOXIDE-PIGMENTED POLYOLEFIN COMPOSITIONS

[75] Inventors: Joseph A. Stretanski, Clinton; Frank F. Loffelman, Bridgewater, both of N.J.

[73] Assignee: American Cyanamid Company, Stamford, Conn.

[21] Appl. No.: 765,575

[22] Filed: Aug. 14, 1985

Related U.S. Application Data

[63] Continuation-in-part of Ser. No. 717,461, Mar. 27, 1985, abandoned, which is a continuation-in-part of Ser. No. 188,801, Sep. 19, 1980, abandoned.

[51] Int. Cl.$^4$ .......................... C08K 5/13; C08K 3/10; C08K 5/09
[52] U.S. Cl. .................................... 524/120; 524/291; 524/413; 524/570; 524/583; 524/585
[58] Field of Search ............... 524/291, 413, 570, 580, 524/583, 585, 120

[56] References Cited

U.S. PATENT DOCUMENTS

| | | | |
|---|---|---|---|
| 3,206,431 | 9/1965 | Doyle et al. | 260/45.85 R |
| 3,285,855 | 11/1966 | Dexter et al. | 260/45.85 B |
| 3,325,441 | 6/1967 | McNally et al. | 260/42.45 |
| 3,502,613 | 3/1970 | Berger | 260/45.85 B |
| 3,511,802 | 5/1970 | Newland et al. | 260/42.45 |
| 3,681,431 | 8/1972 | Dexter et al. | 260/45.85 B |
| 3,900,442 | 8/1975 | Zannucci et al. | 260/42.46 |
| 3,971,755 | 7/1976 | Zannucci et al. | 260/42.44 |
| 4,038,250 | 7/1977 | Lind | 260/45.85 B |
| 4,042,476 | 8/1977 | Collins et al. | 204/159.16 |
| 4,185,009 | 1/1980 | Mathis | 260/42.45 |
| 4,192,794 | 3/1980 | Wang et al. | 260/42.44 |
| 4,237,042 | 12/1980 | Stretanski | 260/45.8 R |

FOREIGN PATENT DOCUMENTS 48344 3/1982 European Pat. Off. .

Primary Examiner—Herbert J. Lilling
Attorney, Agent, or Firm—John W. Cornell

[57] ABSTRACT

Polyolefin compositions which are pigmented with titanium dioxide are rendered actinic radiation stabilized by incorporating therein a $C_{12-20}$ alkyl ester of 3,5-di-tert.butyl-4-hydroxybenzoic acid.

18 Claims, No Drawings

STABILIZED TITANIUM DIOXIDE-PIGMENTED POLYOLEFIN COMPOSITIONS

This application is a continuation-in-part of application Ser. No. 717,461, filed Mar. 27, 1985, now abandoned, which is in turn a continuation-in-part of application Ser. No. 188,801, filed Sept. 19, 1980, also abandoned.

The present invention relates to the stabilization of titanium dioxide-pigmented polyolefin compositions against degradation caused by actinic radiation, particularly UV-radiation. More particularly, it relates to the use of $C_{12}$–$C_{20}$ alkyl esters of 3,5-di-tert.butyl-4-hydroxybenzoic acid as light stabilizers for polypropylene, ethylenepropylene copolymer, and high-density polyethylene, containing a pigmenting amount of titanium dioxide. The invention particularly relates to the use of n-hexadecyl 3,5-di-tert.butyl-4-hydroxybenzoate as a light stabilizer for titanium dioxide-pigmented high-density polyethylene (HDPE).

Pigmented polyolefins have wide use in diverse products. $TiO_2$-pigmented HDPE, especially, finds wide use in camper tops, stadium seats, and food containers, particularly large storage containers for grain and the like. Presently used light stabilizers, such as certain 2-hydroxy-4-alkoxy benzophenones and nickel-n-butylamine complexes of 2,2'-thiobis(p-tert.octyl phenol), provide acceptable levels of protection against UV-degradation; however, there is a continuing need for improved light stabilizers, particularly for use in food containers. Tert.butylphenyl salicylate is believed to be the only compound acceptable for broad use in contact with food products; however, it is not a very effective light stabilizer.

In accordance with the present invention, it has been discovered that higher alkyl esters, that is $C_{12}$ to $C_{20}$ alkyl esters, of 3,5-di-tert.butyl-4-hydroxybenzoic acid provide unexpectedly high levels of protection against UV-degradation when used in titanium dioxide-pigmented polyolefins. Moreover, n-hexadecyl 3,5-di-tert.butyl-4-hydroxybenzoate provides exceptional light stability in titanium dioxide-pigmented high-density polyethylene.

U.S. Pat. No. 3,206,431 discloses the use of alkyl esters of 3,5-di-tert.butyl-4-hydroxybenzoic acid as light stabilizers for polyolefins in combination with a hindered phenol antioxidant. U.S. Pat. Nos. 3,681,431 and 3,285,855 disclose the use of n-octadecyl 3,5-di-tert.butyl-4-hydroxybenzoate as an antioxidant for polyolefins. British Pat. No. 1,336,931 teaches the use of aryl esters of 3,5-di-tert.butyl-4-hydroxybenzoic acid as light stabilizers for polyolefins in combination with a benzophenone and a peroxide decomposer. U.S. Pat. No. 3,502,613 teaches a synergistic combination of an aryl ester of 3,5-di-tert.butyl-4-hydroxybenzoic acid, a chlorobenzotriazole, a phenolic antioxidant, and a thiodipropionate ester as a light stabilizer for polypropylene. Finally, Stretanski, in U.S. Ser. No. 951,230 now U.S. Pat. No. 4,237,042 discloses a light stabilizer composition for polyolefins comprising n-hexadecyl 3,5-di-tert.butyl-4-hydroxybenzoate and a dialkyl pentaerythrityl diphosphite.

None of the aforementioned patents teach or suggest the high level of light stability provided to titanium dioxide-pigmented polyolefins by the incorporation therein of a $C_{12}$ to $C_{20}$ alkyl ester of 3,5-di-tert.butyl-4-hydroxybenzoic acid. Moreover, there is no suggestion that the incorporation of a higher alkyl ester of 3,5-di-tert.butyl-4-hydroxybenzoic acid into titanium dioxide-pigmented high-density polyethylene will provide unexpectedly high levels of light stability. The degree of light stability afforded by the esters of the present invention is unexpected, especially in $TiO_2$-pigmented high-density polyethylene, because a similar degree of protection is not realized with aryl esters, for example, the 2,4-di-tert.butylphenyl ester of 3,5-di-tert.butyl-4-hydroxybenzoic acid of the aforementioned British patent, nor with other commonly used light stabilizers, such as 2-hydroxy-4-octyloxybenzophenone, 2-(2'-hydroxy-3',5'-di-tert.butyl-phenyl)-4-chlorobenzotriazole, or the nickel-butylamine complex of 2,2'-thiobis(p-tert.octylphenol).

The higher alkyl esters of 3,5-di-tert.butyl-4-hydroxybenzoic acid are known compounds, prepared according to procedures described in U.S. Pat. No. 3,681,431 for the preparation of n-octadecyl analog, except that other higher alcohols are used instead of n-octadecanol.

The term "titanium dioxide-pigmented" means any polyolefin to which the present invention relates, such as polypropylene, ethylene-propylene copolymer, and high-density polyethylene, containing at least about 2% by weight of $TiO_2$, although more may be used. Other pigments, of course, may be used in combination with $TiO_2$ in such polymer compositions to provide a wide range of colors and shades. Commonly used pigments for such purposes include cadmium red, chrome yellow, molybdenum orange inorganic pigments, and diarylide yellow, Pigment Red 48, phthalocyanine blue and green organic pigments, and the like. The amount of such additional colorants used will vary widely and the invention is not limited to any amount.

The amount of $C_{12}$–$C_{20}$ alkyl ester used will generally fall within the range of about 0.1–2 percent by weight, although about 0.2–1 percent is generally effective. Although the benefits of the invention are provided by the use of the esters alone, additional benefits may be obtained by the use of a combination of the ester with a dialkyl pentaerythrityl diphosphite, as disclosed in the aforementioned Stretanski application, the disclosure of which is incorporated herein by reference.

Other commonly used additives for polyolefins in general, and high-density polyethylene in particular, may be incorporated into the polymer, such as antioxidants, other light stabilizers, lubricants, and so forth.

EXAMPLE 1

Two commercial grades of high density polyethylene (I, Rigidex 002-55P, British Petroleum; and II, Rumiten 2745, Rumianca) were compounded with the light stabilizers shown in the following table, with and without the additional presence of 2.5 percent titanium dioxide. The compounds were incorporated into the polymer at a temperature of 175°–185° C. and compression molded into films at 180°–185° C. The films were exposed in a Xenotest 150 at 25±5° C./60±10% relative humidity using a rain cycle of 5 minutes spray, 25 minutes dry. The films were removed periodically and the carbonyl content determined. Failure is determined to occur at a change in carbonyl content of 0.05%.

Compounds tested were:
A. n-hexadecyl 3,5-di-tert.butyl-4-hydroxybenzoate
B. 2-hydroxy-4-octyloxybenzophenone
C. n-butylamine-nickel complex of 2,2'-thiobis(p-t.octylphenol)

D. 2-(2'-hydroxy-3'.5'-di-tert.butylphenyl)-4-chlorobenzotriazole

Data are shown in the accompanying table.

The data shown that n-hexadecyl 3,5-di-tert.butylbenzoate (A) provides unexpectedly better light stability to titanium dioxide-pigmented high density polyethylene than other commonly used light stabilizer compounds.

TABLE I

| | | Hours to $\Delta CO = 0.05\%$ | | | |
|---|---|---|---|---|---|
| | | Polymer I | | Polymer II | |
| Stabilizer | Percent | Alone | +2.5% $TiO_2$ | Alone | +2.5% $TiO_2$ |
| None | — | 250 | 720 | 250 | 440 |
| A | 0.5 | 2900 | 5060 | 1390 | 4650 |
| B | 0.5 | 3150 | 960 | 870 | 860 |
| C | 0.5 | 3240 | 3850 | 1420 | 3470 |
| D | 0.5 | 1520 | 850 | 620 | 570 |

EXAMPLE 2

The stabilizing ability of the specifically disclosed hindered phenol antioxidants in U.S. Pat. No. 3,325,441 was comapred to he stabilizing ability of the stabilizers of this invention. The comparison was made utilizing a commercial grade of high density polyethylene.

The hindered phenol antioxidant stabilizers of U.S. Pat. No. 3,325,441 utilized are identified as follows:

| STABILIZER | CHEMICAL NAME |
|---|---|
| A | 2,6-di-tert-butyl-4-methylphenol |
| B | 4,4'-thiobis(6-tert-butyl-m-cresol) |
| C | 4,4'-butylidenebis(6-tert-butyl-m-cresol) |
| D | 2,6-bis(2-hydroxy-3-t-butyl-5-methyl-benzyl)-p-cresol |
| E | 2,2'-methylenebis(4-ethyl-6-tert-butylphenol) |
| F | 2,2'-methylenebis(4-methyl-6-tert-butylphenol) |

The stabilizers of this invention utilized are identified as follows:

| STABILIZER | CHEMICAL NAME |
|---|---|
| G | n-hexadecyl 3,5-di-tert-butyl-4-hydroxybenzoate |
| H | n-octadecyl 3,5-di-tert-butyl-4-hydroxybenzoate |

Following the procedure of Example 1, samples of the stabilized high density polyethylene were made, for each stabilizer, both with and without the additional presence of 2.5 percent (by weight) titanium dioxide. The concentration of stabilizer used in the samples was 0.5% by weight. Failure is determined to occur at a change in the carbonyl content of 0.05 percent. The results are reported in Table II.

TABLE II

Stabilization Of HDPE With Stabilizers Of This Invention (G & H) vs Stabilizers Not Of This Invention (A-F)

| | Hours to Failure | |
|---|---|---|
| Stabilizer | Without $TiO_2$ | With 2.5% $TiO_2$ |
| None | 370 | 570 |
| A | 700 | 2475 |
| B | 100 | 280 |
| C | 250 | 750 |
| D | 100 | 325 |
| E | 200 | 400 |
| F | 175 | 350 |
| G | 1950 | 5800 |
| H | 2900 | 5800 |

The data in Table II demonstrate that stabilizers of this invention—e.g., stabilizers G and H—are unexpectedly superior in their stabilizing ability in comparison with stabilizers not of this invention—e.g., stabilizers A-F.

EXAMPLE 3

The stabilizing ability of various commercially available stabilizers not of this invention were compared with the stabilizing ability of the stabilizers of this invention. The comparison was made using a commercial grade of each of the following: polypropylene (PP), and propyleneethylene (PP/PE) copolymer.

The stabilizers not of this invention that were utilized are identified as follows:

| STABILIZER | CHEMICAL NAME |
|---|---|
| A | 2,2'-methylenebis(4-ethyl-6-tert-butylphenol), obtained from American Cyanamid Co. |
| B | 2,2'-methylenebis(4-methyl-6-tert-butylphenol), obtained from American Cyanamid Co. |
| C | 4,4'-thiobis(3-methyl-6-tert-butylphenol), obtained from Monsanto Co. under the product designation SANTONOX. |
| D | 4,4'-butylidene(3-methyl-6-tert-butylphenol), obtained from Monsanto Co. under the product designation SANTONOX WHITE POWDER. |
| E | 2,6-di-tert-butyl-4-methylphenol, obtained from Shell Oil Co. under the product designation BHT. |
| F | 2,6-bis(2-hydroxy-3-tert-butyl-5-methylbenzyl-p-cresol), obtained from American Cyanamid Co. |

The stabilizers of this invention that were utilized are identified as follows:

| STABILIZER | CHEMICAL NAME |
|---|---|
| G | n-hexadecyl 3,5-di-tert-butyl-4-hydroxybenzoate, obtained from American Cyanamid Co. |
| H | n-octadecyl 3,5-di-tert-butyl-4-hydroxybenzoate, obtained from American Cyanamid Co. |

The PP was obtained from Shell Oil Co. under the product designation SHELL KM 6100. The PP/PE copolymer was obtained from Montedison under the product designation MOPLEN EPS 30X which is believed to be a 7% block copolymer of ethylene and propylene.

Following the procedure of Example 1, except as indicated below, samples of the stabilized PP and PP/PE were made, for each stabilizer, both with and without the additional presence of 2.5 percent (by weight) titanium dioxide. The concentration of stabilizer used in the samples was 0.5% by weight. Failure is determined to occur at a change in the carbonyl content of the percent indicated below. The hours to failure was determined by exposing the films in a 6,000 Watt Xenon unit.

The exceptions to the procedure of Example 1 are as follows:

1. PP: Temperature of the milling process was about 170°–175° C.; temperature of the molding process was about 216° C. (420° F.); and the hours to failure was at a carbonyl content of 0.1%.

2. PP/PE: Temperature of the milling process and the molding process as well as the hours to failure were the same as for PP above.

The results for Example 3 are reported in Table III (LLDPE), (PP) and Table IV (PP) and Table V (PP/PE). The results reported are an average of two films.

TABLE III

Stabilization Of PP With Stabilizers Of This Invention (G & H) vs. Stabilizers Not Not Of This Invention (A–F)

| Stabilizer | Hours To Failure | |
|---|---|---|
| | Without $TiO_2$ | With 2.5% $TiO_2$ |
| None | 275 | 410 |
| A | 200 | 285 |
| B | 180 | 185 |
| C | 230 | 220 |
| D | 165 | 170 |
| E | 390 | 670 |
| F | 100 | 155 |
| G | 2575 | 2800 |
| H | 2610 | 3420 |

TABLE IV

Stabilization Of PP/PE Copolymer With Stabilizers Of This Invention (G & H) vs. Stabilizers Not Of This Invention (A–F)

| Stabilizer | Hours To Failure | |
|---|---|---|
| | Without $TiO_2$ | With 2.5% $TiO_2$ |
| None | 270 | 465 |
| A | 130 | 280 |
| B | 120 | 210 |
| C | 105 | 160 |
| D | 220 | 330 |
| E | 285 | 500 |
| F | 110 | 175 |
| G | 580 | 1400 |
| H | 570 | 1535 |

The results in Tables III and IV demonstrate that stabilizers of this invention—e.g. stabilizers G and H—are unexpectedly superior in their stabilizing ability in comparison with stabilizers not of this invention—e.g., stabilizers A–F.

EXAMPLE 4

The stabilizing ability of various commercially available stabilizers not of this invention were compared with the stabilizing ability of the stabilizers of this invention. The comparison was made using a commercial grade of linear low density polyethylene (LLDPE).

The stabilizers not of this invention that were utilized are identified as follows:

| STABILIZER | CHEMICAL NAME |
|---|---|
| A | 2,2'-methylenebis(4-ethyl-6-tert-butyl-phenol), obtained from American Cyanamid Co. |

-continued

| STABILIZER | CHEMICAL NAME |
|---|---|
| B | 2,2'-methylenebis(4-methyl-6-tert-butyl-phenol), obtained from American Cyanamid Co. |
| C | 4,4'-thiobis(3-methyl-6-tert-butylphenol), obtained from Monsanto Co. under the product designation SANTONOX. |
| D | 4,4'-butylidene(3-methyl-6-tert-butylphenol), obtained from Monsanto Co. under the product designation SANTONOX WHITE POWDER. |
| E | 2,6-di-tert-butyl-4-methylphenol, obtained from Shell Oil Co. under the product designation BHT. |
| F | 2,6-bis(2-hydroxy-3-tert-butyl-5-methyl-benzyl-p-cresol), obtained from American Cyanamid Co. |

The stabilizers of this invention that were utilized are identified as follows:

| STABILIZER | CHEMICAL NAME |
|---|---|
| G | n-hexadecyl 3,5-di-tert-butyl-4-hydroxy-benzoate, obtained from American Cyanamid Co. |
| H | n-octadecyl 3,5-di-tert-butyl-4-hydroxy-benzoate, obtained from American Cyanamid Co. |

The LLDPE utilized was obtained from Unifos-Sweden under the product designation UNIFOS MGM 3432.

Following the procedure of Example 1, except as indicated below, samples of the stabilized LLDPE were made for each stabilizer, both with and without the additional presence of 2.5 percent (by weight) titanium dioxide. The concentration of stabilizer used in the samples was 0.5% by weight. Failure is determined to occur at a change in the carbonyl content of the percent indicated below. The hours to failure was determined by exposing the films in a 6,000 Watt Xenon unit.

The exceptions to the procedure of Example 1 are as follows:

1. LLDPE: Temperature of the milling process was about 146° C.; temperature of the molding process was about 204° C. (400° F.); and the hours to failure was at a carbonyl content of 0.5%.

The results reported in Table V are an average of two films.

TABLE V

Stabilization Of LLDPE With Stabilizers Of This Invention (G & H) vs. Stabilizers Not Of This Invention (A–F)

| Stabilizer | Hours To Failure | |
|---|---|---|
| | Without $TiO_2$ | With 2.5% $TiO_2$ |
| None | 655 | 785 |
| A | 485 | 1040 |
| B | 490 | 1005 |
| C | 705 | 1125 |
| D | 605 | 1155 |
| E | 790 | 900 |
| F | 395 | 740 |
| G | 1855 | 2470 |
| H | 1975 | 2530 |

The results in Table V demonstrate that stabilizers of this invention, i.e. stabilizers G and H, are unexpectedly superior in their stabilizing ability in comparison with stabilizers not of this invention, i.e. stabilizers A–F.

What is claimed is:

1. A composition stable toward degradation caused by actinic radiation comprising: a polyolefin; at least about 2 percent by weight of titanium dioxide; and an actinic radiation stabilizing amount of a $C_{12}$ to $C_{20}$ alkyl ester of 3,5-di-tert-butyl-4-hydroxybenzoic acid.

2. A composition of claim 1 wherein said polyolefin is high density polyethylene.

3. A composition of claim 1 wherein said polyolefin is a copolymer of ethylene and propylene.

4. A composition of claim 1 wherein said polyolefin is polypropylene.

5. A composition of claim 1 wherein said ester is n-hexadecyl 3,5-di-tert-butyl-4-hydroxybenzoate or n-octadecyl 3,5-di-tert-butyl-4-hydroxybenzoate.

6. A composition of claim 2 wherein the ester is n-hexadecyl 3,5-di-tert-butyl-4-hydroxybenzoate or n-octadecyl 3,5-di-tert-butyl-4-hydroxybenzoate.

7. A composition of claim 3 wherein the ester is n-hexadecyl 3,5-di-tert-butyl-4-hydroxybenzoate or n-octadecyl 3,5-di-tert-butyl-4-hydroxybenzoate.

8. A composition of claim 4 wherein the ester is n-hexadecyl 3,5-di-tert-butyl-4-hydroxybenzoate or n-octadecyl 3,5-di-tert-butyl-4-hydroxybenzoate.

9. A composition of claim 2 wherein said ester is n-hexadecyl 3,5-di-tert-butyl-4-hydroxybenzoate.

10. A composition of claim 1 wherein said ester comprises from about 0.1 to about 2 percent by weight of said composition.

11. A composition of claim 1 wherein said composition additionally contains a dialkyl pentaerythrityl diphosphite.

12. A composition of claim 1 wherein said composition additionally contains one or more inorganic or organic colored pigments.

13. A composition stable toward degradation caused by actinic radiation comprising: a polyolefin; at least about 2 percent by weight of titanium dioxide; and from about 0.1 to about 2 percent by weight of the actinic radiation stabilizers n-hexadecyl-3,5-di-tert-butyl-4-hydroxybenzoate or n-octadecyl-3,5-di-tert-butyl-4-hydroxy benzoate.

14. A composition of claim 13 wherein said actinic stabilizer is present in an amount of about 0.5 percent by weight.

15. A composition of claim 13, wherein said titanium dioxide is present in an amount of about 2.5 percent by weight.

16. A composition of claim 13 wherein said actinic stabilizer is present in an amount of about 0.5 percent by weight and said titanium dioxide is present in an amount of about 2.5 percent by weight.

17. A composition of claim 1 wherein said polyolefin is linear low density polyethylene.

18. A composition of claim 17 wherein the ester is n-hexadecyl 3,5-di-tert-butyl-4-hydroxybenzoate or n-octadecyl 3,5-di-tert-butyl-4-hydroxybenzoate.

* * * * *